United States Patent [19]

Dickson et al.

[11] Patent Number: 4,595,351

[45] Date of Patent: Jun. 17, 1986

[54] APPARATUS FOR APPLYING A DECORATIVE SEAL TO ENVELOPES AND THE LIKE

[75] Inventors: Richard A. Dickson, Goldvein, Va.; Allen H. Forrester, Cleburne, Tex.

[73] Assignee: Omni Direct Mail Services, Ltd., Vienna, Va.

[21] Appl. No.: 677,474

[22] Filed: Dec. 3, 1984

[51] Int. Cl.$^4$ .......... B29C 59/02

[52] U.S. Cl. .......... 425/114; 264/259; 264/293; 425/110; 425/126 R; 425/127; 425/143; 425/386

[58] Field of Search .......... 264/28, 40.7, 259, 268, 264/293, DIG. 67; 425/384, 385, 386, 114, DIG. 9, DIG. 108, 110, 126 R, 127, 143

[56] References Cited

U.S. PATENT DOCUMENTS

| | | | |
|---|---|---|---|
| 1,393,263 | 10/1921 | Clifton . | |
| 1,611,840 | 12/1926 | Ralston . | |
| 1,705,107 | 3/1929 | Durkee | 425/386 |
| 1,714,147 | 5/1929 | Weisbarth | 425/386 |
| 2,235,738 | 3/1941 | Curtis . | |
| 2,302,060 | 11/1942 | Ryan . | |
| 3,186,890 | 6/1965 | Dorn et al. . | |
| 3,496,262 | 2/1970 | Long et al. | 264/293 |
| 3,496,610 | 2/1970 | Shelby et al. | 425/384 |
| 3,622,659 | 11/1971 | Sonia | 264/293 |
| 4,054,632 | 10/1977 | Franke . | |
| 4,054,636 | 10/1977 | Menig | 264/268 |
| 4,352,771 | 10/1982 | Szabo | 425/384 |

FOREIGN PATENT DOCUMENTS

| | | | |
|---|---|---|---|
| 752286 | 2/1967 | Canada | 264/28 |
| 2136360 | 9/1984 | United Kingdom | 425/385 |

*Primary Examiner*—James Lowe
*Attorney, Agent, or Firm*—Laubscher & Laubscher

[57] ABSTRACT

A method and apparatus for forming a decorative seal on envelopes and the like is disclosed. The envelopes to be embossed are intermittently transported along a conveyor past various processing stations. At a first station, a quantity of heated molten seal material is deposited at a desired location on an envelope. The envelope is next transported to a first cooling station where a stream of cooled air is directed against the deposited molten material for partial cooling. At a subsequent stamping position, a cooled embossed die is applied to the seal material to form an embossed decorative pattern therein. The envelope is then transported to a refrigerated chamber which accelerates solidification of the stamped seal material to form an embossment. The timing of the intermittent movement of the conveyor is controlled in accordance with the quantity, temperature, and type of seal material used to form the embossment.

8 Claims, 5 Drawing Figures

COOLED AIR SOURCE
VARIABLE PRESSURE SOURCE
CONTROL MECHANISM

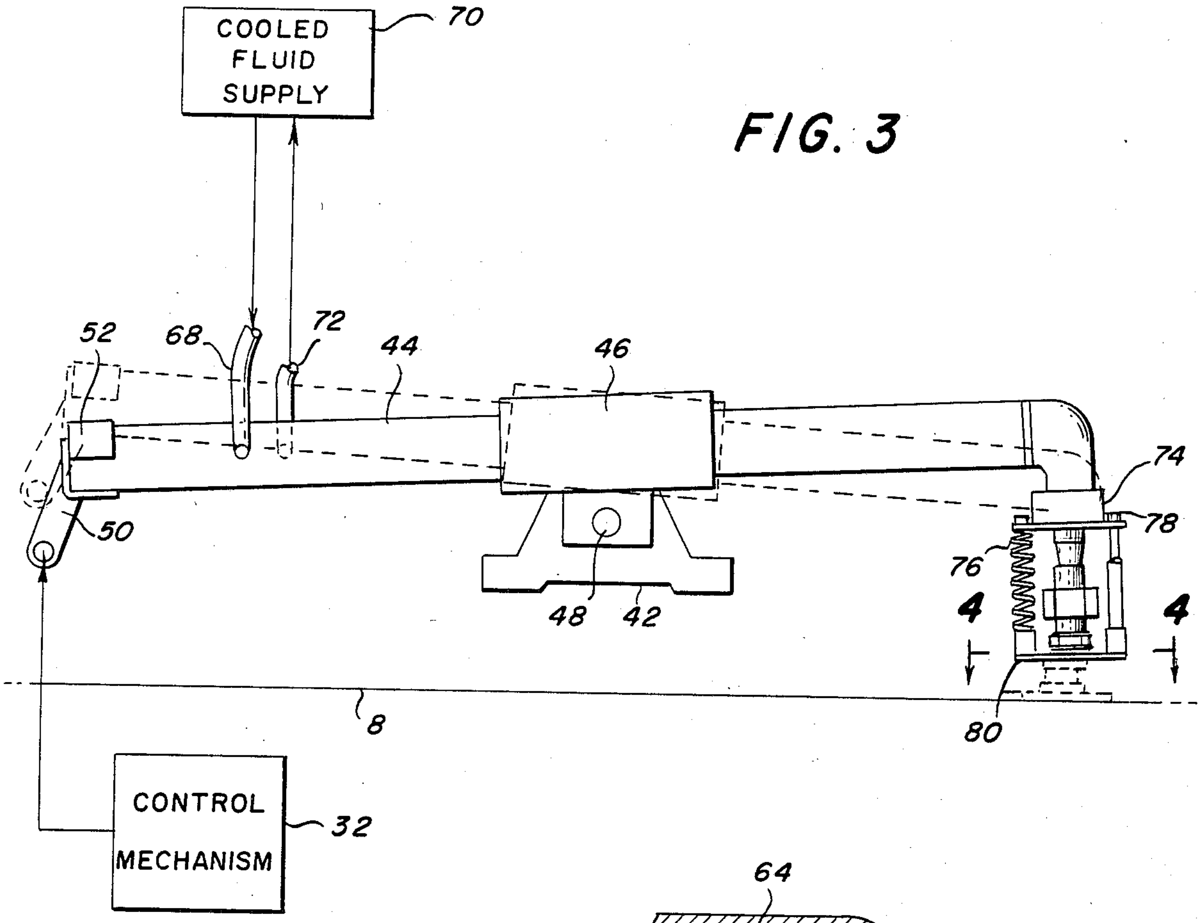
FIG. 3
FIG.4
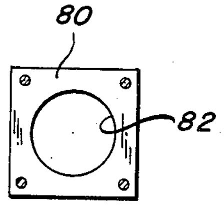
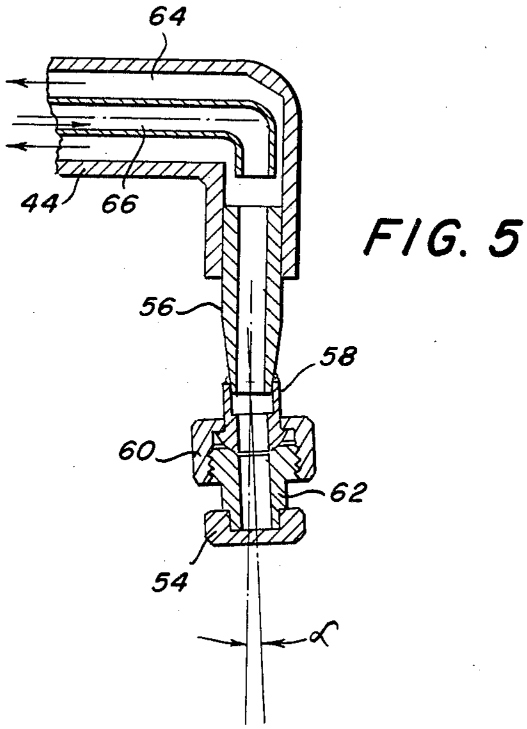
FIG. 5

APPARATUS FOR APPLYING A DECORATIVE SEAL TO ENVELOPES AND THE LIKE

BACKGROUND OF THE INVENTION

The present invention relates to a method and apparatus for automatically applying wax or other seal material to letters or documents and subsequently applying a seal imprint to the seal material. Using mass production techniques, a large quantity of letters impressed with a customerzied seal may be produced.

BRIEF DESCRIPTION OF THE PRIOR ART

Various devices for forming wax seals are known in the prior art, as evidenced by the patents to Clifton U.S. Pat. No. 1,393,263, Ralston U.S. Pat. No. 1,611,840, Weisbarth U.S. Pat. No. 1,714,147 and Curtis U.S. Pat. No. 2,235,738. The Clifton patent, for example, discloses an apparatus for forming seals on packages or the like. The apparatus includes a container for maintaining wax in a soft heated state. A quantity of the soft wax is dispensed from the container through a nipple onto the package. A seal is then used to imprint a desired design on the soft wax.

While the prior devices normally operate quite satisfactorily, none of them lend themselves to mass production techniques using a variety of seal materials ranging from conventional wax to synthetic plastic materials.

The present invention was developed in order to overcome these and other drawbacks of the prior devices by providing a method and apparatus for carefuly controlling the seal material application temperature, the seal material cooling rate, and the temperature of a seal die used to form an embossment from the seal material, whereby decorative embossed seals of wax or synthetic plastic material may be automatically applied to letters or documents in mass production fashion at a controlled rate.

SUMMARY OF THE INVENTION

Accordingly, it is a primary object of the present invention to provide an automated method and apparatus for forming a decortive seal on envelopes and the like. The apparatus includes a frame having a conveyor mounted thereon for successively transporting a plurality of envelopes in a generally horizontal linear direction. A drive mechanism is connected with the conveyor to intermittently drive the same. A heated seal material container is connected with the frame for storing heated seal material in a molten state and has a dispenser connected therewith for depositing a given quantity of molten material at a given location on an envelope. A stamping device is pivotally connected with the frame downstream from the dispenser and includes an embossed die operable to stamp a decorative pattern into the molten material on the envelope. The die contains a conduit which is connected with a cooling fluid source, whereby during stamping of the molten seal material, the stamped material is cooled by the die to a temperature slightly below the solidification temperature thereof leaving a rim or bead of molten material around the edge thereof. A control device is connected with the drive mechanism in order to control the time interval between deposit of the molten material and stamping of the deposited material in accordance with the quantity, temperature, and type of seal material applied to the envelope.

According to a further object of the invention, a first cooling device comprising a nozzle for directing an air flow onto the seal material is connected with the frame between the dispensing and stamping devices for partially cooling the seal material prior to stamping.

According to another object of the invention, a second cooling device comprising a refrigerated chamber is connected with the frame downstream from the stamping device for solidifying the bead of seal material surrounding the embossed portion thereof.

According to yet another object of the invention, the stamping device includes a spring-biased bracket surrounding and normally extending below the die member so that when the die is removed from the seal material, the bracket retains the envelope.

According to a further object of the invention, the seal material comprises a synthetic plastic material.

BRIEF DESCRIPTION OF THE FIGURES

Other objects and advantages of the invention will become apparent from a study of the following specification when viewed in the light of the accompanying drawing, in which:

FIG. 3 is a detailed plan view of the stamping mechanism according to the invention;

FIG. 4 is a sectional view taken along lines 4—4 of FIG. 3; and

FIG. 5 is a detailed sectional view of the stamping mechanism illustrating the cooling fluid conduit contained therein.

DETAILED DESCRIPTION

Figures 1, 2:
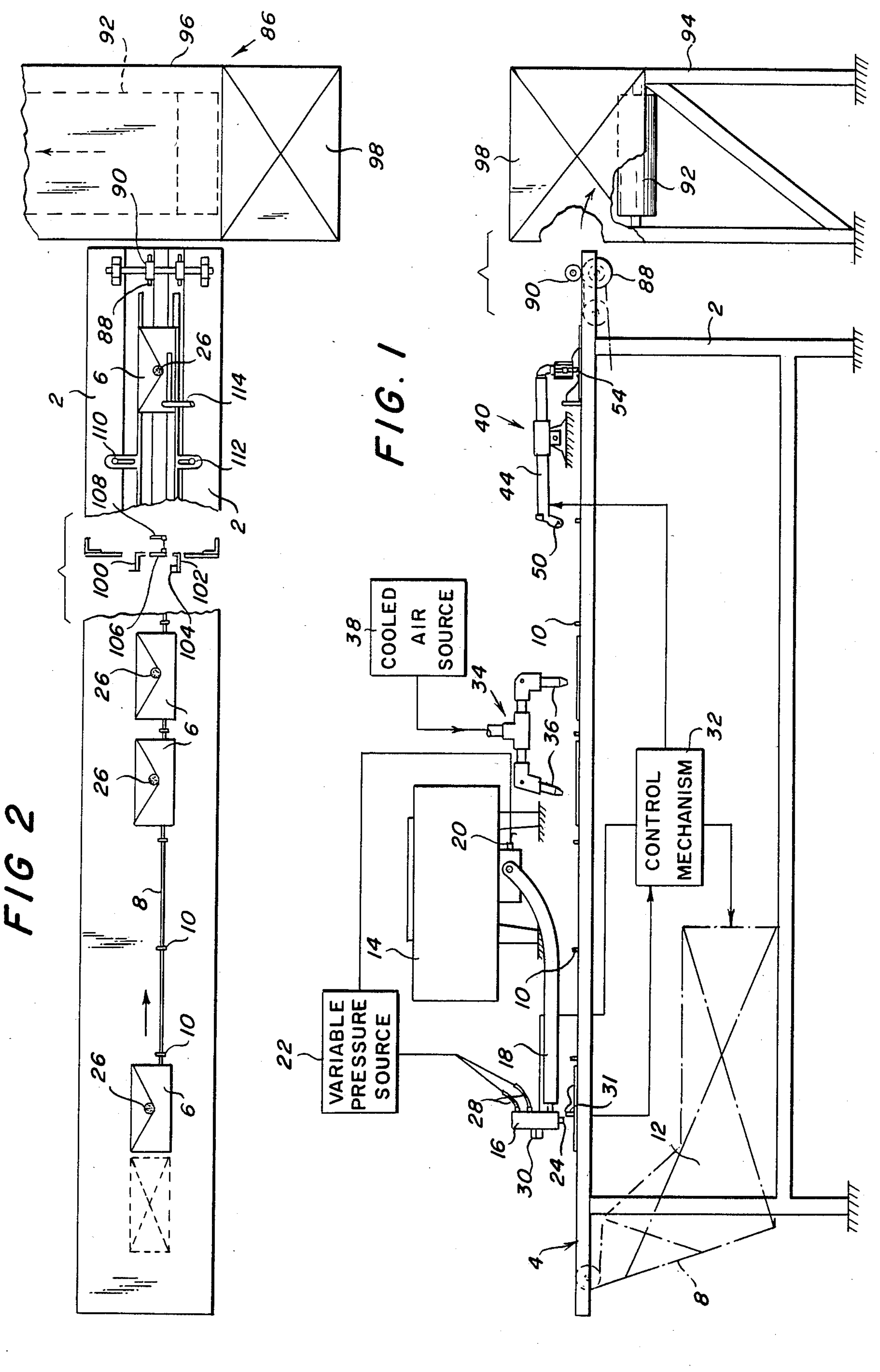
FIG. 1 is a front plan view of the apparatus for applying a decorative seal to a plurality of envelopes.
FIG. 2 is a top plan view of the apparatus of FIG. 1 with some of the processing components removed to illustrate in particular the conveyor for transporting successive envelopes.

As shown in FIG. 1, the apparatus for applying a decorative seal to a plurality of successive envelopes or the like comprises a frame 2 for supporting a conveyor 4 which transports a plurality of envelopes 6 (FIG. 2) along the frame in a generally horizontal linear direction.

The conveyor preferably comprises a sprocket chain 8 having a plurality of tabs 10 which are equally spaced along the length thereof. The tabs 10 extend normal to the chain and are operable to engage the rear edge of the envelopes to propel them along the frame as shown in FIG. 2. A drive mechanism 10 is connected with the conveyor chain to intermittently drive the chain as will be developed in greater detail below.

As shown in FIGS. 1 and 2, the conveyor is operable to transport a plurality of envelopes through a series of successive processing stations which are accurately spaced apart as a function of the spacing between the tabs 10 on the conveyor chain.

At a first station, envelopes 6 are placed on the conveyor 4, one envelope being provided for each tab 10. The envelopes are next transported by the conveyor to a seal material deposit station where a selected quantity of seal material is applied to a given location on the envelope. More particularly a seal material supply container 14 is provided which heats and stores a seal material in a molten state. The seal material may comprise a wax substance heated to a temperature of approximately 190° F. Wax materials are preferred for affixing a seal to official documents or the like. For use in forming a decorative seal on envelopes, however, the seal material is preferably a synthetic petro-chemical plastic material which is heated to a temperature of approximately 260° F. Synthetic plastic materials are generally less expensive than waxes, may be provided in a variety of colors, and provide a more durable seal capable of withstanding the shocks and extremes applied to an envelope during mailing.

Seal material from the container 14 is delivered to a dispenser 16 via a conduit 18. A pressure line 20 is connected with a variable pressure source 22 to control the pressure of the seal material within the conduit 18. The dispenser 16 includes a nozzle 24 through which the seal material is deposited on the envelope. As shown in FIG. 2, the blob or mass 26 of seal material is deposited on the envelope at a desired location, with each mass being of a uniform quantity, size, and configuration to enhance the subsequent processing steps in the formation of the decorative seal. Pressure control of the dispensed seal material is afforded owing to the dispenser pressure lines 28 connected with the variable pressure source 22. In order to accomodate different sized envelopes or other documents, the dispenser 16 is adjustably mounted on a bracket 30 for accurate positioning adjacent the desired location for deposit of the seal material. A limit switch 30 is mounted on the frame 2 and connected with a control mechanism 32. The control mechanism controls the operation of the dispenser 16 as will be developed in greater detail below. The limit switch 30, via the control mechanism 32, prevents the dispenser from dispensing seal material in the absence of an envelope or the like.

The next processing station along the conveyor 4 comprises a first cooling device 34. The first cooling device comprises an air flow mechanism including one or more nozzles 36 connected with a cooled air source 38. The nozzles direct a flow of cooling air onto the mass of molten seal material 26 to partially cool the mass prior to stamping. It is important that the mass of seal material not be cooled to a temperature below the solidification temperature of the material. However, the initial cooling of the material has been found to improve the ability of the material to accept and retain the embossed configuration administered by the stamping device. The air flow also serves to shapen the molten mass of material, whereby each mass has a uniform configuration just prior to stamping.

Following the first cooling device 34, the conveyor 4 transports the envelopes bearing the uniform masses of partially cooled molten seal material to the stamping mechanism 40.

Referring now to FIG. 3, the stamping mechanism includes a mounting bracket 42 fixed to the frame 2 and a stamping arm 44 pivotally connected with the mounting bracket through a fixture 46 and a horizontal pivot shaft 48. The stamping arm 44 includes a lever 50 connected at one end thereof by a clamp 52. The lever 50 is vertically displaced by the control mechanism 32 to pivot the stamping arm in a synchronized manner with operation of the drive mechanism 12 and operation of the dispenser 16 as will be discussed below.

At its other end, the stamp arm 44 has an embossed stamp or die 54 mounted thereon. As shown more particularly in FIG. 5, the stamp arm 44 has a hollow stamping head member 56 fitted therein which in turn has a ball member 58 connected therewith. A collar 60 is mounted on the ball member and has its axis arranged at a given angle relative to a vertical plane normal to the horizontal plane of the conveyor 4. A die fixture 62 is threadably connected with the collar member, whereby the embossed die 54 may be removed and replaced with a die of a different size or having a different decorative pattern formed thereon.

The stamp arm 44 contains a pair of conduits 64, 66 for transporting cooled fluid to and from the die 54 via the hollow head 56, ball member 58, collar 60, and fixture 62. More particularly, a fluid supply line 68 connects the fluid delivery conduit 64 with a cooled fluid supply 70 and a fluid return line 72 connects the fluid return conduit 66 with the supply. The cooled fluid from the supply preferably comprises a mixture of water and anti-freeze which is chilled to a temperature of between 20° F. and 30° F.

The stamping arm also includes a bracket 74 mounted thereon around the stamping head member 56. Suspended from the bracket 74 by four springs 76 connected with the bracket by screws 78 is a rectangular plate 80 containing a central opening 82 as shown in FIG. 4. Referring again to FIG. 3, the plate is normally positioned below the embossed surface of the die 54. Moreover, the diameter of the opening 82 is greater than the diameter of the die 54.

An envelope 6 having a mass 26 of molten seal material is transported by the conveyor chain 8 to a position beneath the cooled embossed die. The control mechanism 32 arrests movement of the conveyor and pivots the stamping arm 44 to force the die downwardly into the mass of material to emboss the material with a decorative pattern. At the same time, the plate 80 is pressed against the envelope against the biasing force of the springs 76. Because the die is cooled by the cooling fluid circulating therethrough, the cooled die further cools the molten material during the stamping thereof to a temperature slightly below the solidification temperature of the material. This further cooling of the mass of molten material is important to ensure that the material retains the embossed decorative pattern when the die is lifted from the material by the stamping arm 44 under control of the control mechanism. The remaining bead of seal material surrounding the embossed portion thereof remains in a molten state.

When the stamping arm is pivoted to raise the die, the die is initially lifted from the material with the plate 80 still being pressed against the envelope. This ensures that the envelope and the stamped mass of material do not adhere to the die but are retained against the conveyor. Upon further pivotal movement of the stamping arm 44, the plate 80 is subsequently lifted away from the envelope.

All materials in the die fixtures are copper, brass or bronze for good heat transfer properties. Intimate contact is maintained, to promote good heat transfer characteristics, by virtue of the design pressfits of all connection points. Tension threaded fittings with pressfits and clean surfaces are used to provide improved heat transfer characteristics.

The principal heat transport mechanism for cooling the seal impression device is the chilled fluid system, with anti-freeze operating in the 20° to 30° F. range. Temperature control of the die surface is primarily maintained through adjustment of the inlet temperature of the chilled fluid. Cooling requirements vary widely depending upon the diameter of the die, the amount of wax being impressed, and the production speed of the machine.

It is the adjustable fluid temperature and the rapid heat transfer characteristics of the die fixture design that provide for the seal impression mechanism to operate with various seal materials over a wide range of seal material solidification temperatures, and to impress those seals upon different letter or document packages at a sustained rate of production.

From the stamping mechanism 40, the envelopes are transported to a second cooling device 86. As shown in FIGS. 1 and 2, a pair of drive rollers 88, 90 receive the envelopes 6 from the conveyor 97 which is mounted on a frame 94 and which extends in a horizontal direction normal to the direction of transport of the first conveyor 8. The second conveyor 92 is arranged within a refrigerated housing 96 mounted on the frame 94. A refrigration source 98 cools the chamber defined within the housing 96. The cooled chamber serves to accelerate cooling of the molten bead surroundng the previously embossed seal material to a temperature below the solidification temperature thereof, whereby the seals harden and the envelopes are ready for further handling. The cooled air source 38 may be used in place of the refrigeration source 98 to simplify the device.

In lieu of the second conveyor, the first conveyor 4 could be extended past the end of the stamping mechanism and surrounded by a housing supplied with cooled air to further cool the stamped seals.

The apparatus according to the invention incorporates a number of variable parameters which make it suitable for use with different sealing materials. There are three principal requirements associated with the methodology for applying the seal material: (1) control of the amount of material deposited in the pool on an envelope or document; (2) the temperature of the pool as related to the temperature that the pool should be at the time of die impression downstream; and (3) the cleanliness of the application, i.e., so that there are no material strings hanging off the dispenser nozzle and so that the pool is a perfectly round formed pool that will be prepared for the impression of the die downstream.

The amount of material can be controlled in three ways: (1) by controlling the temperature of the material in the supply container; (2) by controlling the pressure on the molten material stream in the dispenser at the nozzle; and (3) by controlling the time of opening and closing of the dispenser valve.

The temperature of the seal material upon application is principally dependent on the ability to maintain a uniform pool on the envelope during the movement along the conveyor. Generally speaking, the material temperature at application would be desired to be as low a temperature as possible and still obtain flow uniformity. This condition maintains a circular round pool of seal material. The lower limit of this application temperature is dependent upon the ability to separate a clean pool of material from the dispenser nozzle. The temperature range of operation would generally fall between 190° F. and 260° F. Stability of application relates to the stability of the pool on the envelope or document during stop and go motion of the conveyor, as it has been observed that the pools tend to flow in a non-uniform fashion which distorts the shape of the pool and therefore destroys the ability to impress a perfect seal.

Flow control of material from the dispenser is performed by the control mechanism by controllng the dispenser valve open time through an electrical signal, by controlling the temperature of the material just prior to application and by controlling the application pressure.

Seal material temperature adjustments are obtained through: (1) control of the temperature of the unpressurized reservior and heating container which is used both as a reservoir for liquid material and as a melting tank for solid bulk material placed into the top container lid; (2) control of the supply feed temperature by way of the adjustment of the temperature in the electrically heated delivery tube; and (3) control of the application temperature of the material by way of adjustment of the temperature of the electrically heated dispenser.

The seal material application methodology heretofore described is for the purpose of providing a carefully controlled seal material temperature application and amount so that the material pool will be in a specific location at a specific spot on a letter or document and in a temperature/time relationship that will assist in preserving the pool so as to promote a uniform seal application later on in the production system.

Synchronization of the intermittent movement of the conveyor 8 and operation of the dispenser 16 and the stamping device 40 is carried out by the control mechanism 32. The control mechanism controls document positioning and the temperature-time window relationship relating to application of the seal material by the dispenser 16 and stamping of the material by the die 54. The control mechanism is used to maximize production speed while maintaining sharp impressions of the seal from the die.

The drive mechanism 12 comprises a conventional electric motor driving a gear box which in turn drives sprockets and the conveyor chain 8. This drive mechanism further provides for two distinct and separate motion time periods by way of a four-bar linkage mechanism, one-way slip clutches, and one-way mechanical stops. Motion periods follow each other alternatingly. The first motion period is for transport motion and the second is a process motion period.

The first half of the motion period provides transport motion to the machine through the driving of the sprocket drive chain 8. Four-bar linkage motion is used to provide slow acceleration of the sprocket drive chain followed by uniform motion, followed by slow deceleration. Positioning of sprocket chain tabs 10 is obtained through a spring pressure cam stop, performing two necessary functions. First, the spring action allows for the stopping of the chain without sudden or jerking motion, thus permitting the envelope to remain carefully in place. Secondly, it provides a slight back-up of the drive chain so as to release the envelope at the stamping assembly 40 for accurate seal die application.

The transport motion is further assisted by the use of mechanical guides to maintain the envelopes, or other documents, in their proper orientation and place within the production system and to assist in maintaining the precise position for both seal material application and die impressment.

As shown in FIG. 2, the frame 2 includes left and right document guides 100, 102, a vertical retainer guide 104 and a document slide surface 106. A chain guide 108 is provided for guiding the drive chain 8. On either side of the drive chain are adjustable fasteners 110, 112 for the side document guides, whereby the width of the guides may be adjusted in accordance with the width of the documents being transported. A spring 114 serves to keep the envelope in place when it is adjacent the stamping mechanism.

The second half of the motion provided by the drive system is the process motion. This process motion functions each time the envelopes or documents come to a standstill at the various stations along the production system. An important function of this motion is the cam shaft control of an electrical signal which actuates the variable pressure source which in turn delivers high pressure air through tubes 28 for the purpose of controlling the time period of material actuation at the dispenser nozzle 24. Control is obtained through the adjustment of the cams on the cam shaft (not shown) in a conventional manner.

Simultaneously with the operation of the seal material dispenser, the control mechanism actuates the stamping arm 44 to lower the die against a downstream mass of material.

The two process motions herein described constitute a complete cycle of process motion. After the processes are complete, process motion stops while transport motion moves the next envelope into position.

For any seal material, it is desirable to maintain the temperature of the material at application from the dispenser as near to its solidification temperature as possible without solidifying on the dispenser nozzle provided, however, that sufficient elasticity of the seal material remains at the die impression position to receive the impression as a clear, sharp, and distinct image. Further, the application of the seal material requires a capability to control the amount of seal material dleposited in the pool, depending upon the size of the die that is in use. The quantity of the wax flow is controlled by adjusting the pressure on the feed conduit, by adjusting the temperature at the nozzle, and by adjusting the time period of the dispenser valve opening and closing. Seal material pool temperature at the die impression location is critical because the impression time window is on the order of 7 to 10 seconds for various materials even though their absolute temperature will vary by as much as 80° F.

Die impression must be performed while the wax pool is in the process of solidifying so that there remains some plasticity in the pool to receive the die without cracking the material surface. The critical nature of the process time-temperature window lies between the point of the pool application and die impression. The process design research performed during the development of this machine revealed that for the synthetic seal material being used, the process time-temperature window, between seal material application and the start of the impression-solidification time window was about 27 seconds without pool cooling. This process time-temperature window can typically be reduced to approximately 20 seconds with cooling. Therefore, a 26% machine speed increase is typically provided by the air cooling of the pool. The impression time window of 7 to 10 seconds begins at the end of the process time window of about 20 to 27 seconds.

The critical nature of the envelope transport motion depends upon the tendency of the seal material pool to distort when undergoing quick sliding or fast acceleration or deceleration of the envelope. Thus, the requirement is established for the controlled rate motion of slow start-up and slow stop to maintain the uniform nature of the wax pool while processing down the conveyor system.

Material pool cooling provided during the process time window, occurring between wax application and seal impressment, allows for a shortening of the length of machine and/or for use of synthetic "wax" materials that melt/solidify at temperatures which typically vary over a range of 190° F. to 260° F. Alternatively, the controlled and adjustable seal pool cooling capability permits use of a fixed length of machine with different sealing substances while still maintaining maximum allowable production speed. Thus, the function of the pool cooling jets is to allow an increase in machine production speed by way of an increase in cooling rate over and above natural cooling.

The key element in the continuous operation of the die impressment mechanism is the provision for continuous cooling of the die surface in order to maintain a constant die surface temperature sufficient to solidify the seal design impression material at the impression point. It is the use of chilled cooling water which provides for an increase in the number of impressions per minute. A further speed-up in production speed is facilitated by the spring-bias plate stripper hold down mechanism which maintains the envelope or document in place while the die is first impressed and them removed.

It is the mechanical linkage between the drive shaft which actuates the seal material applicator, and the impressment mechanism, which provides for the accurate placement of the die seal on the pool. This is substantially assisted by the use of spring pressure which holds the envelope or document in a stationary position after they have been brought to rest. This is provided by the action of surface pressure springs both at the material application point and the die impression point, in conjunction with the sprocket drive channel and drive tabs which have a slight reverse motion at the point of stopping, to permit the envelope or document to remain quite stationary while the material application and die impression is made.

While in accordance with the provisions of the Patent Statutes the preferred forms and embodiments have been illustrated and described, it will become apparent to those skilled in the art that various changes or modifications may be made without deviating from the inventive concepts set forth above.

What is claimed is:

1. Apparatus for applying a decorative seal to envelopes and the like, comprising (a) a frame;

(b) conveyor means mounted on said frame for successively transporting a plurality of envelopes along said frame in a generally horizontal linear direction;

(c) drive means connected with said conveyor means for intermittently driving said conveyor means;

(d) heated seal material supply means connected with said frame for storing heated seal material in a molten state;

(e) dispenser means connected with said supply means for depositing a given quantity of molten material at a given location onto an envelope;

(f) stamping means pivotally connected with said frame downstream from said dispenser means, said stamping means including an embossed die operable to stamp a decorative pattern into the molten material deposited on the envelope;

(g) cooling means connected with said embossed die, whereby during stamping of the molten seal material, the stamped material is cooled to a temperature slightly below the solidification temperature thereof leaving a bead of molten material around the edge thereof; and (h) control means connected with said drive means, said dispenser means, and said stamping means for controlling the intermittent drive of said conveyor means, the given quantity of molten material deposited on the envelope, and the actuation and release of said stamping means to emboss the deposited material, whereby the time interval between deposit of the molten material and stamping of the deposited material and the time interval of the stamping operation are controlled in accordance with the quantity, temperature, and type of seal material applied to the envelope.

2. Apparatus as defined in claim 1, and further comprising first cooling means connected with said frame between said dispensing and stamping means for partially cooling deposited molten seal material.

3. Apparatus as defined in claim 2, and further comprising second cooling means connected with said frame downstream from said stamping means for solidifying the stamped seal material.

4. Apparatus as defined in claim 3, wherein said embossed die contains a conduit, and further wherein said stamp cooling means comprises a cooled fluid source connected with said conduit, whereby the fluid flowing through said conduit cools said die to insure that the embossed pattern formed in the seal material retains its configuration when said die is removed from the material.

5. Apparatus as defined in claim 4, wherein said stamping means further comprises a spring-biased plate surrounding and extending below said die, whereby when said die is removed from the seal material, said plate retains the envelope on the conveyor.

6. Apparatus as defined in claim 2, wherein said first cooling means comprises means for directing an air flow onto the deposited seal material.

7. Apparatus as defined in claim 3, wherein said second cooling means comprises a refrigerated chamber.

8. Apparatus as defined in claim 5, wherein said deposited material comprises a synthetic plastic material.

* * * * *